Dec. 27, 1949   R. E. BURCHELL   2,492,733

TUBE TESTING APPARATUS

Filed Dec. 26, 1947

Inventor:
Robert E. Burchell,
by Merton D. Moore
His Attorney

Patented Dec. 27, 1949

2,492,733

UNITED STATES PATENT OFFICE 2,492,733

TUBE TESTING APPARATUS

Robert E. Burchell, Syracuse, N. Y., assignor to General Electric Company, a corporation of New York Application December 26, 1947, Serial No. 793,783

6 Claims. (Cl. 315—364)

This invention relates to tube testing apparatus and more particularly to a testing device provided with means for indicating a short circuit existing between elements of an electron discharge device.

An object of the invention is to provide testing apparatus incorporating improved short circuit indicating means.

A more particular object of the invention is to provide apparatus arranged to indicate the existence of a short circuit between elements of an electron discharge device which will test for such short circuits without subjecting thet device under test to voltages or currents of a magnitude sufficient to damage the device.

A further object is to improve the sensitivity and reliability of short circuit testing apparatus for electron discharge devices.

Another object is to provide short circuit testing means which may be readily incorporated with devices and circuits for determining the condition of electron discharge devices.

A still further object of the invention is to provide a short circuit indicating device, such as a neon lamp, which will serve the auxiliary purpose of indicating energization of the tube testing apparatus.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a circuit diagram of a short circuit testing circuit according to the invention, and Fig. 2 is a circuit diagram of a complete tube testing device for providing several different tests and incorporating a short circuit testing circuit of the type shown in Fig. 1.

Figure 1:
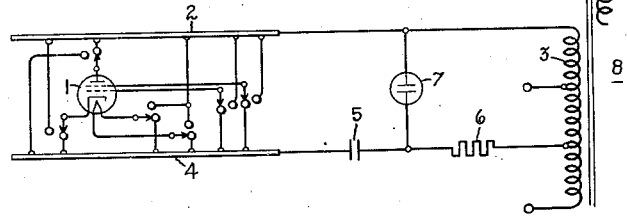
Figure 2:
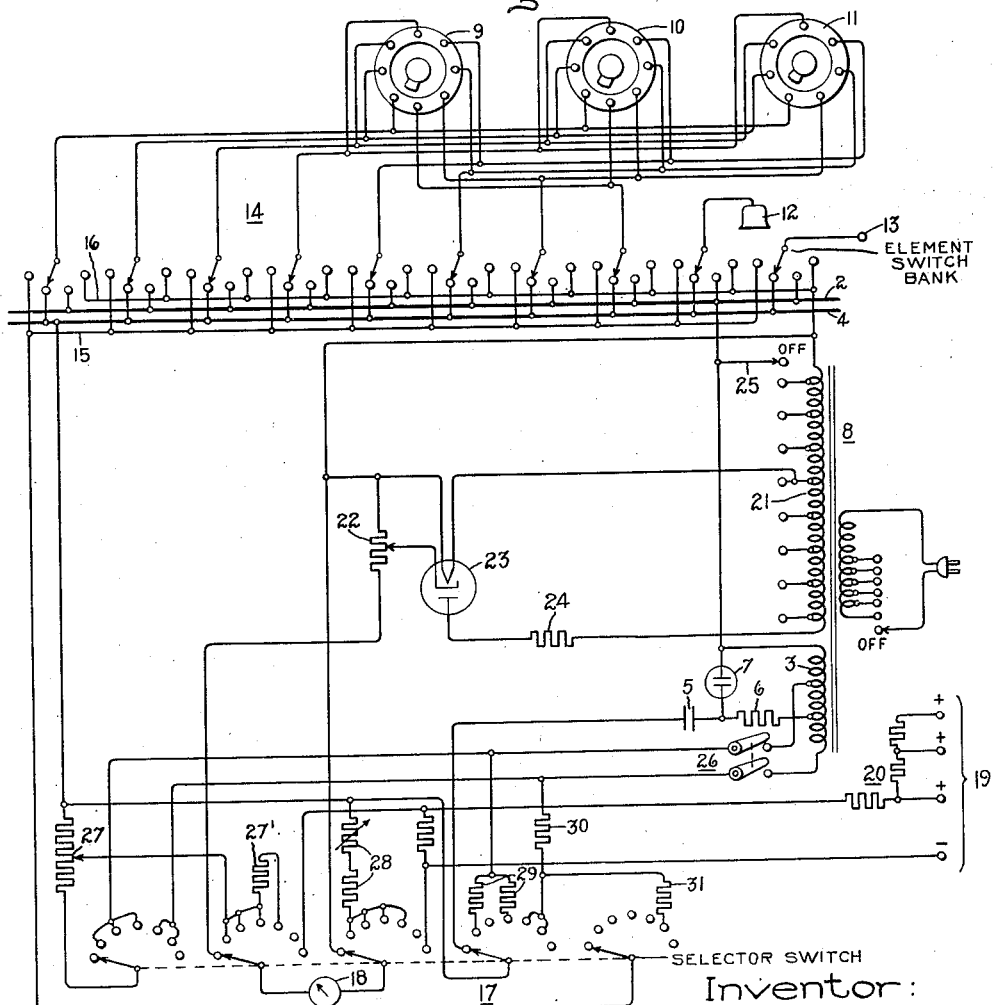

Turning now to Fig. 1 of the drawings, an electron discharge device 1, such as is commonly referred to as a tube, is so arranged that the several elements thereof may be selectively connected through manually operated element switches to one or the other of two busses. One bus 2 is connected to one end terminal of the secondary winding 3 of a power supply transformer and the other bus 4 is connected to a tap on winding 3 through a capacitor 5 and resistor 6 in series.

A neon lamp 7 is normally supplied with operating voltage at the frequency of the supply source, such as 60 cycles, being arranged in series connection with resistor 6 across the portion of the transformer secondary winding between the aforementioned end terminal and tap thereof.

In an operating equipment, the neon lamp may be one rated at about one-quarter watt, such as General Electric Company type NE–45, resistor 6 may have a resistance of 240,000 ohms and capacitor 5 a capacitance of 0.5 microfarad. The voltage provided between the aforementioned end terminal and tap is 115 volts.

The element switches shown connected between the tube elements and respective busses permit the connection of one element, such as the anode as shown, to the upper bus 2 while all the remaining elements are connected to bus 4. With the circuit constants as outlined, leakage resistance between the anode and any one or group of the other elements which is of the order of one-quarter megohm or less will cause the neon lamp to be extinguished, and it has been found that for leakage resistances up to about 400,000 ohms, there will be a noticeable decrease in intensity in the neon lamp. Operation of the element switch associated with the anode to connect it to bus 4, and of another switch, such as one associated with one of the grid elements, to connect the grid element to bus 2, will provide a short circuit or leakage test to detect excessive leakage between the selected grid element and all of the other tube elements. Normally, each element will be tested in this manner.

In testing tubes of low current ratings, it is desirable to provide a testing circuit that can, under no conditions, damage the tube by causing excess current flow or excessive voltages. With circuit constants as shown, tthe maximum possible current through a short circuit between busses 2 and 4 will be approximately 0.00046 ampere, and thte maximum voltage on open circuit between the busses is approximately 60 volts. The result is that all types of electronic vacuum tubes in common tubes may be safety tested, and the device is additionally useful for testing devices of the type, for instance, including crystal detector diodes, metal oxide rectifiers, and thermistors without subjecting the device to greater than rated currents.

It is to be understood that the neon lamp will glow whenever power is supplied through energization of transformer winding 3 but will be extinguished by a short circuit between busses 2 and 4 if the resistance of the short circuit is below approximately one-quarter megohm, and will be of noticeably reduced intensity if the resistance of the short circuit is less than approximately 400,000 ohms, With reference now to Fig. 2, the short or leakage testing circuit is shown as it may be incorporated with other circuits for providing emission tests of electron discharge devices, and for use as a voltmeter for external voltage measurements.

The testing apparatus of Fig. 2 incorporates the short and leakage testing circuit of Fig. 1 as identified by the secondary winding 3 of transformer 8, resistor 6 connected to a tap on the winding, neon lamp 7, connected in series with the resistor across the portion of the winding from the tap mentioned to one end terminal, capacitor 5 connected in series from the neon lamp end of resistor 6 to the bus 4 through a switch section to be later described, bus 2 connected directly to the above mentioned end terminal of winding 3, and a plurality of tube sockets 9, 10, 11 arranged to receive tubes of various base arrangements. While three such sockets are shown, it will be understood that additional sockets will be usually desirable to accommodate additional types of tube bases. Further flexibility is provided by the incorporation into the circuits arranged to be connected to the elements of tubes or other devices to be tested of a grid clip 12 of the usual type and a terminal 13 which may comprise a jack or binding post of conventional type and which may be used to connect one of the grid caps of a tube having two grid caps, or for connection to devices which do not have tube base terminals, such as thermistors or crystal diodes.

A group of ten individually operable single pole four-position element switches 14 are provided, the armatures of eight of the switches being individually connected to the eight corresponding separate terminals of socket 9 and to corresponding terminals of sockets 10 and 11 and of any additional sockets which may be provided. For sockets of less than eight terminals, less than eight switches are, of course, so connected. The two remaining switches have armatures connected to grid clip 12 and terminal 13 respectively. The four stationary contacts of each switch are connected to four common busses, the first contact of each being connected to bus 15 which is associated with the open position of each switch; the second, to bus 4, which is associated with a switch position that may be called the normal position; the third contact, to bus 2, corresponding to the short or leakage test position; and the fourth, to bus 16, which provides a filament or heater connection. It will be apparent that each of the elements may be connected to any one of the busses by manually adjusting the armature to the appropriate position.

A multiple ganged selector switch 17 is arranged to select the operation desired. In the extreme counterclockwise position of the armatures as shown in Fig. 2, the circuit is completed to provide for short circuit and leakage tests, and in addition to furnish voltage readings on a suitable galvanometer 18 for adjusting the line voltage settings as later to be described.

The next four positions of the armatures in the clockwise direction complete connections for testing emission on, respectively, heavy current tubes, very light current tubes, medium current tubes, and cold cathode tubes or others requiring high starting potentials. The next, or sixth position, completes a circuit which permits the testing of electron ray tubes, and the final extreme clockwise position permits the use of galvanometer 18 as a voltmeter for measuring direct current voltages of external apparatus, terminals 19 and multiplying resistors 20 being provided for this purpose.

Power transformer 8 includes a tapped primary winding with a switching arrangement for connecting a source of alternating current from the conventional dual connector plug across a desired portion of the winding. With switch 17 in its first or extreme counterclockwise position, a primary winding tap is selected which gives a desired predetermined voltage reading on meter 18, whereby different supply voltages may be compensated. For this presenting operation, the whole secondary filament winding 21 of the transformer is connected to a series rectifying circuit including, from the upper end of the transformer secondary as shown in the drawing, a portion of an adjusting potentiometer resistor 22, the cathode of a rectifier tube 23, the anode of the rectifier, and a current limiting resistor 24 to the other end of the winding. In an operative apparatus, a current limiting resistor 24 of 68,000 ohms has been found satisfactory for use if the full scale meter deflection is produced by 500 microamperes and the secondary winding 21 gives a total voltage of approximately 120 volts. Under these conditions, the potentiometer resistor 22 should be about 2,000 ohms. A direct current voltage is produced across the above mentioned portion of resistor 22 which is proportional to the voltage of winding 21. By a proper presetting of the potentiometer resistor 22, the meter 18 can be made to read half scale when the correct primary winding tap is selected for any normal supply line voltage, for instance, between 105 and 130 volts. The meter, it will be seen, is connected in shunt to the above mentioned portion of resistor 22, the other portion of the resistor being in series with the meter.

After the supply line voltage adjustment of the primary winding has been completed, the elements of a tube which is inserted in one of the sockets 9, 10, 11, or in another similarly arranged socket, may be tested for short circuits or excessive leakage by operating each armature of selector switches 14 in turn to the contact connected to bus 2 and then back to the normal position in connection with bus 4. If the resistance between the element associated with any one of the armatures and the remaining elements is less than approximately 240,000 ohms, the neon lamp 7, which is normally energized, will be completely extinguished, or it will show reduced intensity if the resistance is less than approximately 400,000 ohms. No damage to the tube or other device under test can occur, since the maximum current that can flow through a short circuit between busses 2 and 4 is approximately 0.46 milliampere, and the open circuit voltage between the busses is about 60 volts. In prior art testers, the short circuit current is as much as 23 milliamperes and the open circuit voltage may be between 100 and 200 volts.

The neon lamp 7 is energized to act as a pilot lamp whenever the tap switch is in position to provide power to the primary winding of transformer 8, unless a low resistance is imposed across busses 2 and 4. There is, in consequence, an immediate indication that the power is being supplied and that the lamp which is to indicate defective tubes is in operating condition and not burned out.

It has been found that capacitance effects between elements of tubes under test which, in prior art testers, gave false indications of leakage are not of consequence in the present circuit.

An additional advantage realized in the apparatus described herein is a difference in the type of glow discharge in the neon lamp in the case of a rectifying device. The neon lamp normaly comprises two electrodes, each of which is surrounded by a glow discharge on alternating current but only one of which is surrounded by a direct current discharge. By observing the discharge in the lamp when a rectifying device of known orientation is connected between the busses 2 and 4, the orientation of other rectifiers may be readily ascertained.

Emission testing of tubes may be accomplished by setting the armatures of switch bank 17 into an appropriate one of the four positions next in the clockwise direction from the supply voltage testing and short and leakage circuit testing position. The appropriate heater voltage is selected by a switch armature 25 cooperating with fixed contacts representing taps on the secondary filament winding 21. The element switch armature connected to one end of the tube heater or filament is moved to establish, through the third associated contact, a connection to bus 2. Emission to any one or any combination of the remaining elements may now be measured on the meter 18 by leaving the armature or armatures of element switch bank 14 which are associated with the selected element or elements in the normal position in connection with bus 4 and by connecting the cathode or emitting element to bus 2 through its associated armature of the element switch bank. If it is desired to omit certain elements from the emission test, they may be connected to bus 15 which is open circuited. This permits the detecting of open circuits between any tube base prong of the device under test and the element which should be connected thereto. For instance, the anode, control grid and screen grid of a pentode tube may be switched to bus 15 to test the emission current flow to the suppressor grid alone acting as an anode.

With the anode or collector element or elements of the tube under test connected to bus 4, and the emitter or cathode element connected to bus 2, a circuit is established from the secondary winding 3, from the top terminal as shown, the emitter element, and from a tap, shown as nearest the said top terminal, through a test switch 26, which is closed preferably against a spring bias during the test, through the left-hand section of selector switch bank 17 and thence through an indexing resistor 27 to bus 4 and the collector elements. A movable contact is preferably provided for contacting an adjustable point on resistor 27. This contact is connected directly to meter 18 for three of the four emission testing positions of the armatures of switch 17, and through a multiplier resistor 27' in the fourth position, and the other terminal of the meter is connected through suitable multiplier resistors 28 to that end of resistor 27 which is connected to bus 4 and thus to the anode or collector elements of the tube under test, whereby the meter is responsive to the voltage drop occurring in the adjustable portion, shown as the upper portion in the drawing, of resistor 27 and may be calibrated to indicate, in terms of emission current, whether or not the tube is satisfactory. The indexing resistor 27 is preferably adjustable by means of a calibrated pointer (not shown) to a predetermined position in accordance with the value of emission current which is exemplary of satisfactory operation for each tube tested. For testing tubes of medium or heavy emission current ratings, with the armatures of switch 17 in the second or fourth position, one or the other of load resistors 29 is connected in shunt across indexing resistor 27, whereby resistor 27 acts as a voltage divider to provide the correct voltage to meter 18. In the third position, resistor 27 is itself the load resistor, and very low current tubes may be emission tested.

One of the resistors 28 may be adjustable to permit initial adjustment of meter sensitivity to the required degree of accuracy. Like the adjustment of resistor 22, this adjustment once made need not be changed, and in commercial apparatus both adjustments would normally be made at the factory.

As mentioned above, the fifth clockwise position of the armatures of switch 17 is applicable for testing tubes, such as cold cathode tubes, which require a high starting voltage. In this switch position, the whole of secondary winding 3 is connected to provide a relatively high testing voltage, an additional resistor 30 being inserted in shunt to the indexing resistor 27.

In the sixth position of the armatures of switch 17, bus 15 is energized from the end terminal of secondary winding 3, through a resistor 31 and the meter is disconnected. Electron ray tubes of the types commonly employed as tuning indicators in radio receivers may now be tested by moving the armature of the element switch connected to the triode grid or other equivalent tube element, back and forth from the position establishing contact with bus 16 to that establishing contact with bus 2 to cause opening and closing of the shadow angle.

In the extreme clockwise position of the armatures of switch 17, the external voltage terminals 19 are connected to the meter in association with desired multiplier resistors 20.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. In apparatus for testing electron discharge devices and the like which comprise a plurality of elements, a source of voltage, a current limiting device in series between one terminal of said source and one of said elements, a connection from the other terminal of said source to another of said elements, and a normally excited indicator lamp in shunt between said elements whereby said lamp is extinguished by a short circuit between said two elements.

2. In apparatus for indicating leakage between elements of an electron discharge device, a source of voltage with two terminals, a resistor and a gaseous discharge lamp connected in series between said terminals, and a shunt circuit for said lamp comprising means for connecting selected elements of said device to opposite terminals of said lamp, whereby leakage between said oppositely connected elements bypasses current around said lamp.

3. A testing device for electron tubes, and the like, comprising a source of voltage, a plurality of connections adapted to be connected through switching means to selectable elements of a tube to be tested, means to apply voltage from said source to said connections, a meter connected to said connections for indicating an operating characteristic of said tube to be tested, an indicating lamp excited by voltage from said source to indicate that voltage is being supplied therefrom, and means, comprising said switching means, for connecting predetermined selected pairs of elements of said tube in shunt with said lamp whereby said lamp provides a visual indication of a low resistance existing between the respective elements of said selected pair.

4. A testing device for electron tubes, and the like, comprising a source of voltage, current indicating means connected to said source in a high impedance circuit to indicate energization of said source, a relatively low impedance circuit in shunt with said indicator means, said low impedance circuit including a normally open portion, means adapted to connect two electron tube terminals to respective sides of said open portion whereby said low impedance circuit may be closed by a leakage path between said terminals to by-pass current from said indicator.

5. A testing device for electron tubes, and the like, comprising a plurality of sockets adapted to complete connections from the elements of a tube under test to a plurality of switch armatures, each of said armatures being individually movable to further complete said connections selectively to one or the other of two conductors, means for applying an alternating voltage between said two conductors, said means comprising current limiting means, and means responsive to the voltage between said conductors for indicating the condition of the tube under test in accord with the current leakage between elements as selectably connected to said respective conductors.

6. In apparatus for testing electron discharge devices and the like which comprise a plurality of elements, a source of alternating current voltage, a current limiting device in series between one terminal of said source and one of said elements, a connection from the other terminal of said source to another of said elements, and a normally excited indicator lamp in shunt between said elements whereby said lamp is extinguished by a short circuit between said two elements.

ROBERT E. BURCHELL.

REFERENCES CITED

The following references are of record in the file of this patent:

UNITED STATES PATENTS

| Number | Name | Date |
|---|---|---|
| 2,002,425 | Williams | May 21, 1935 |
| 2,021,877 | Kolkmann | Nov. 19, 1935 |
| 2,264,066 | Buchard | Nov. 25, 1941 |

OTHER REFERENCES

Radio Test Instruments, by Rufus P. Turner, Ziff-Davis Publishing Co., New York, N. Y., 1946.

Emergency Ohmeter, by A. P. Nielson, Radio News, Jan. 1945, page 219.